United States Patent [19]

Takagi

[11] 4,236,186
[45] Nov. 25, 1980

[54] POWER BREAKER SYSTEM
[75] Inventor: Yoichiro Takagi, Nagoya, Japan
[73] Assignee: Mitsubishi Denki Kabushiki Kaisha, Tokyo, Japan
[21] Appl. No.: 4,200
[22] Filed: Jan. 17, 1979
[51] Int. Cl.³ ............................................. H02H 3/08
[52] U.S. Cl. ........................................ 361/9; 361/11; 361/58; 361/65
[58] Field of Search ............... 361/5, 6, 7, 9, 10, 361/11, 58, 63, 65, 67

[56] References Cited

U.S. PATENT DOCUMENTS

| | | | |
|---|---|---|---|
| 3,454,831 | 7/1969 | Willard | 361/11 |
| 3,873,887 | 3/1975 | Barkan et al. | 361/63 X |

FOREIGN PATENT DOCUMENTS 24651 7/1974 Japan .

Primary Examiner—Harry E. Moose, Jr.
Attorney, Agent, or Firm—Oblon, Fisher, Spivak, McClelland & Maier

[57] ABSTRACT

A power breaker system comprises a main breaker having a short timing delay function which is connected to a power source; a current limiting circuit for limiting fault current which is connected to the main breaker; and a plurality of branch load circuits consisting of each feeder breaker and each load which are connected to the current limiting circuit.

3 Claims, 8 Drawing Figures

4,236,186

POWER BREAKER SYSTEM

BACKGROUND OF THE INVENTION

1. Field of the Invention

The present invention relates to a power breaker system which is used in a main circuit of a distributor. More particularly, it relates to a power breaker system which selectively breaks feeder breakers connected to a plurality of load circuits by fault current limiting function and a short timing delay function of breaking operation of a main breaker.

2. Description of the Prior Arts

Heretofore, power breaker systems shown in FIGS. 1 and 2 have been known.

In the power breaker system of FIG. 1, a main breaker ACB is connected between a power source terminal (1) and a plurality of branch load circuits ($2_1$) to ($2_n$) which respectively comprises feeder breakers $B_1$ to $B_n$, electromagnetic switches $MS_1$ to $MS_n$ and loads $L_1$ to $L_n$ such as induction motors.

In the circuit, when a short-circuit fault is caused at a point $F_1$ in the branch load circuit $2_1$, it is necessary to break only the fault circuit and to continue the feeding to the other circuits $2_2$ to $2_n$, and accordingly, the main breaker ACB has short timing delay function to actuate the feeder breaker $B_1$ before actuating the main breaker ACB so as to attain the selective breaking.

The selective breaking can be attained by the breaker system having such structure, however the system has not a function for limiting fault current, whereby the feeder breaker is broken when excess fault current is passed. Accordingly, it has been serious problem to consider a protection of a feeder breaker.

On the other hand, in the other conventional system of FIG. 2, a current limiting fuse F having large break capacity is used instead of the main breaker ACB to give said current limiting function. That is, the current limiting fuse F is fused by passing excess energy. When a fault current $A_1$ is passed as shown in FIG. 3, the fuse is fused at the point $A_2$ by storing energy E (hatching part) in the fuse F. Accordingly, the feeder breaker is protected by the fuse F when the energy for fusing the fuse is lower than a maximum energy of the feeder breaker. In such circuit system, a power distribution to all of circuits is interrupted after fusing the fuse F (point $P_1$ in FIG. 3) and the selective breaking can not be attained even though the back-up of the feeder breaker can be expected.

SUMMARY OF THE INVENTION

The present invention is to overcome said disadvantages and to provide a power breaker system which comprises a current limiting circuit imparting current limiting function in abnormal state which is connected in series to a main breaker having short timing delay function.

In accordance with the present invention, a selective breaking of a feeder breaker in a branch load circuit and a protection of feeder breakers can be attained.

Feeder breakers having lower breaking capacity can be used in branch circuits to attain cost-down since fault current is reduced by a current limiting circuit.

The current limiting circuit comprises a resistor connected in parallel to a permanent fuse having non-linear resistant function to feed continuously the current to non-fault circuits after a current limiting operation by the permanent fuse and to set a desired current level for the current limiting operation by selecting resistance of the resistor.

DETAILED DESCRIPTION OF THE PREFERRED EMBODIMENTS

Figure 1:
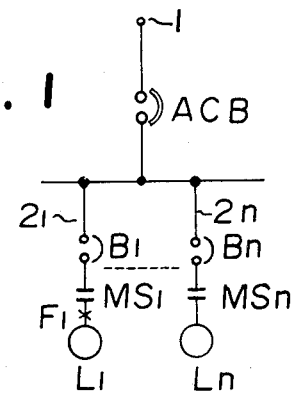
FIG. 1 is a circuit diagram of the conventional power breaker system using a main breaker.
Figure 2:
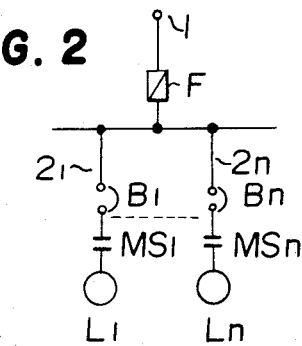
FIG. 2 is a circuit diagram of the conventional power breaker system using a current limiting fuse in a main circuit.

Referring to the drawings, embodiments of the present invention will be illustrated.

Figure 4:
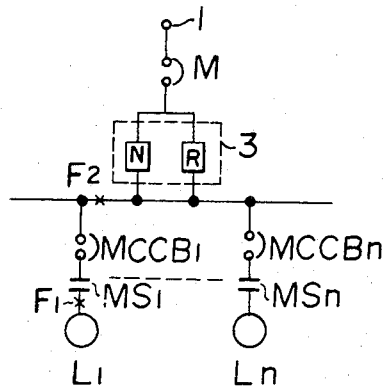
FIG. 4 is a circuit diagram of one embodiment of the power breaker system according to the present invention.
Figure 3:
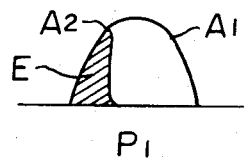
FIG. 3 shows operating characteristic curve of the fuse.

In FIG. 4, a main breaker M comprises a short timing delay mechanism and a current limiting circuit (3) is connected between the main breaker M and branch load circuits $2_1$ to $2_n$. The current limiting circuit comprises a nonlinear current resistor N connected in parallel to a linear current resistor R. The nonlinear current resistor N has a structure increasing its self-resistivity in high level by self-heating when a large current is passed or a structure increasing its self-resistivity in high level by a reversible phase change caused by self-heating (for example, phase change of sealed material from solid to gas such as permanent fuse containing sodium metal). The resistor R is a linear current resistor.

In the normal state, a resistivity of the nonlinear current resistor N has remarkably lower than that of the resistor R, whereby the current is mainly passed through the nonlinear current resistor N.

In the abnormal state such as short-circuit fault, the resistivity of the nonlinear current resistor N increases remarkably higher than that of the resistor R, whereby the current is commutated to the resistor R. The current level at the commutation can be set as desired by selecting the resistor R.

The power breaker system having said structure will be illustrated.

Figure 5:
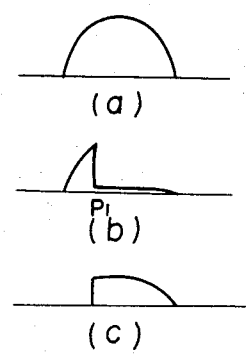
FIG. 5 shows current waveform of current passing through a nonlinear current resistor (N) and a linear resistant resistor (R) in the power breaker system according to the present invention.

When a fault is caused at the point $F_2$ in FIG. 4, the fault current shown in FIG. 5(a) is passed if there is no power breaker.

In accordance with the present invention, the fault current is passed through the nonlinear current resistor N and the nonlinear current limiter N is changed in nonlinear by heat caused by the fault current to limit substantially, the current at the point $P_1$ and the waveform shown in FIG. 5(b) is given.

The fault current is commutated to the linear current resistor R connected in parallel to the nonlinear current resistor N from the point $P_1$, and the waveform shown in FIG. 5(c) is given. Accordingly, when the fault is caused at the point $F_1$, the current limiting operation for the fault current is started by the nonlinear current resistor N and the power is fed through the resistor R to the other circuits in normal state until breaking the fault circuit $F_1$ by the breaker $MCCB_1$. The main breaker M is connected between the power source and a parallel circuit of the nonlinear current resistor N and the resistor R and the main breaker performs breaking operation in a large current region and has timing function to said operation to give a selective breaking function.

In a fault on a commmon bus bar at the point $F_2$, the current is interrupted under limiting the current after a predetermined time by the main breaker.

Figure 6:
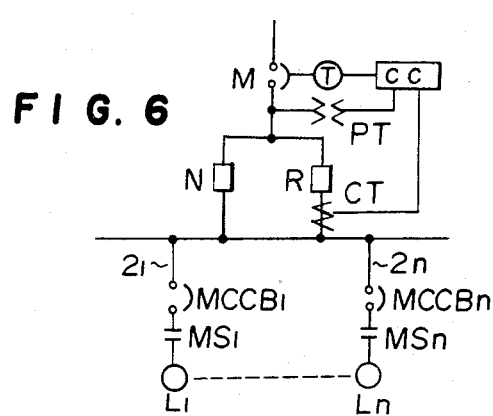
FIG. 6 is a circuit diagram of the other embodiment of the power breaker system according to the present invention.

FIG. 6 shows the electrical short timing delay operation of the main breaker M.

The main breaker M comprises a shunt trip coil T to perform the breaking operation by excitation of the shunt trip coil T. The trip coil T is operated by an output of a control circuit CC shown in FIGS. 7 and 8 in detail.

Figure 7:
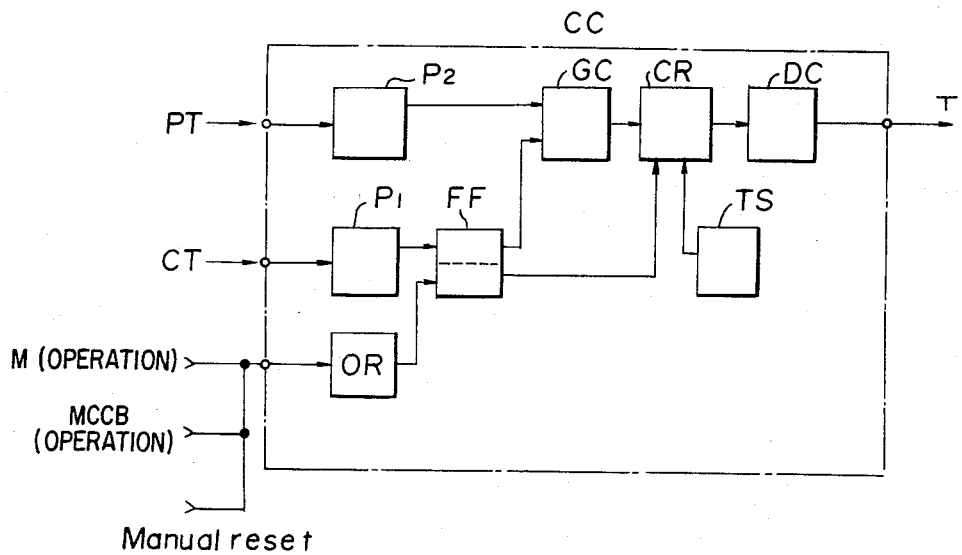
FIG. 7 is a circuit diagram of a control circuit for operating the main breaker.

Referring to FIG. 7, the operation of the control circuit CC will be illustrated.

When the resistivity of the nonlinear current resistor N is increased by the fault current, the current passing through the resistor R is detected by a current transformer CT (FIG. 6). The current having the current waveform is converted into rectangular waveform pulse by passing the current through a waveform converter circuit $P_1$. A flip-flop FF is triggered by the rectangular waveform pulse to open the gate circuit GC by the output of the flip-flop. On the other hand, the voltage of a transformer PT (FIG. 6) is passed through the waveform converter circuit $P_2$ to give rectangular waveform pulse. The pulse is passed through the gate circuit GC by a signal of the current transformer CT during the time opening the gate circuit GC. The pulse passing through the gate circuit GC is counted by a counter circuit CR. When the counted value is reached to a value set by a timing set circuit TS, an output signal is fed to an output circuit DC. The output circuit DC which receives the output signal excites the trip coil T of the main breaker M to perform the breaking operation of the main breaker M.

In this system, the timing is set in a time being proportional to frequency of the power source (about several cycles in such system) to perform the delay operation of the main breaker.

Thus, the flip-flop FF is reset by outputting an OR circuit OR by the breaking operation of the main breaker M, the operation of the feeder breaker $MCCB_n$ or a hand reset of the breaker and the counter circuit CR is reset by the signal for the reset of the flip-flop FF.

Figure 8:
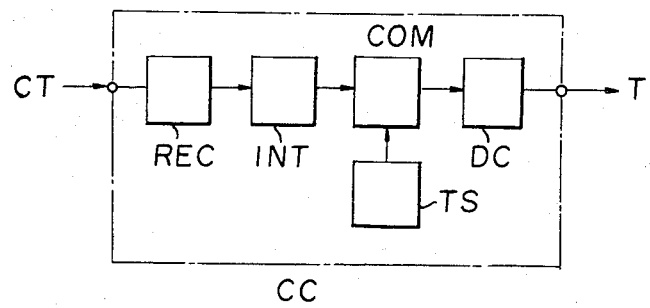
FIG. 8 is a circuit diagram of the other embodiment of the control circuit.

FIG. 8 shows the other embodiment of the control circuit CC. The detecting current of the current transformer CT is rectified to DC voltage by a rectifier circuit REC and the output voltage is input to a resistor-capacitor integration circuit INT. The voltage change in the integration circuit INT is input to a voltage comparator circuit COM, and it is compared with the voltage set in the comparator circuit COM.

When the input signal from the integration circuit INT becomes higher than the predetermined value, a signal is fed to an output circuit DC after a delay time set by a timing set circuit TS. Then, the output circuit DC excites the trip coil T of the main breaker M to start the operation of the main circuit M.

The control circuit CC can have the other circuits having different structures.

As described above, when the power breaker system of the present invention is connected to the power source side of a switchboard or a centrallized control board, the capacity of the feeder breaker used in each branch circuit can be reduced because of the current limiting function and the feeder breakers in the branch circuits in normal state except the fault circuit can be protected. The selective breaking function can be attained because enough delay time is set for the main breaker by the current limiting function.

What is claimed is:

1. A power breaker system which comprises:
   a main breaker having a short timing delay function which is connected to a power source, said main breaker including a trip coil for operating the breaker mechanism;
   a current limiting circuit for limiting fault current which is connected to said main breaker, said current limiting circuit including a linear current resistor in parallel with a non-linear circuit resistor;
   a plurality of branch load circuits each consisting of a feeder breaker and a load which are connected to said current limiting circuit;
   wherein said trip coil of said main breaker is controlled by a detector for detecting a current passing through said linear resistor of said current limiting circuit and by a device for generating an output for operating said trip coil in short timing delay after receiving a signal from said detector.

2. A power breaker system according to claim 1 wherein said nonlinear current resistor in said current limiting circuit is a permanent power fuse containing sodium metal in sealed condition.

3. A power breaker system according to claim 1 wherein the current in the current-limiting operation is adjusted to a predetermined value by selecting the resistivity of said resistor in said current limiting circuit.

* * * * *